W. B. McNAMARA.
PAPER FOLDING MACHINE.
APPLICATION FILED APR. 26, 1909.
1,063,993.
Patented June 10, 1913.
10 SHEETS—SHEET 2.
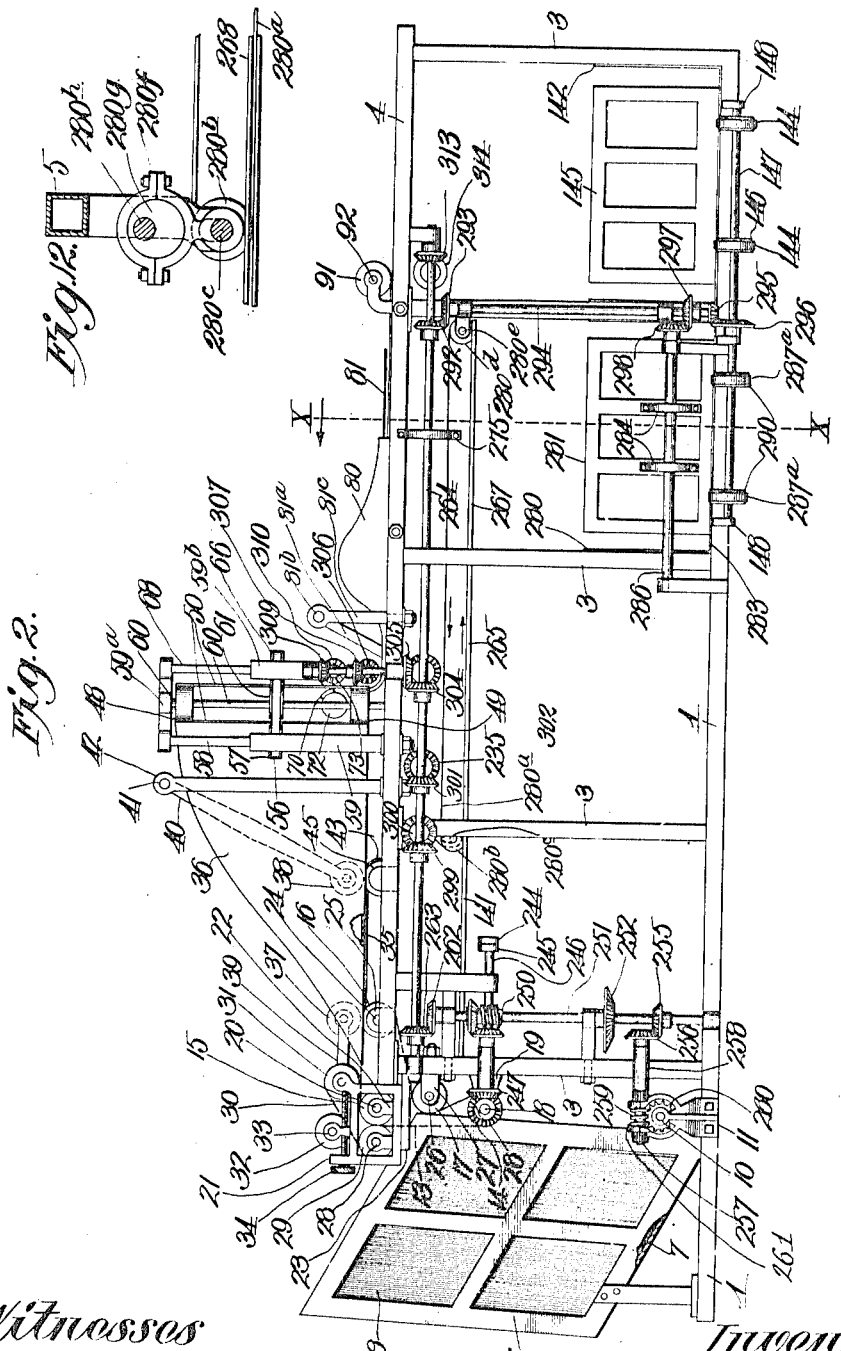
Witnesses
Frank R. Love
M. A. O'Donnell.
Inventor
W. B. McNamara
By George J. Thorpe Atty.

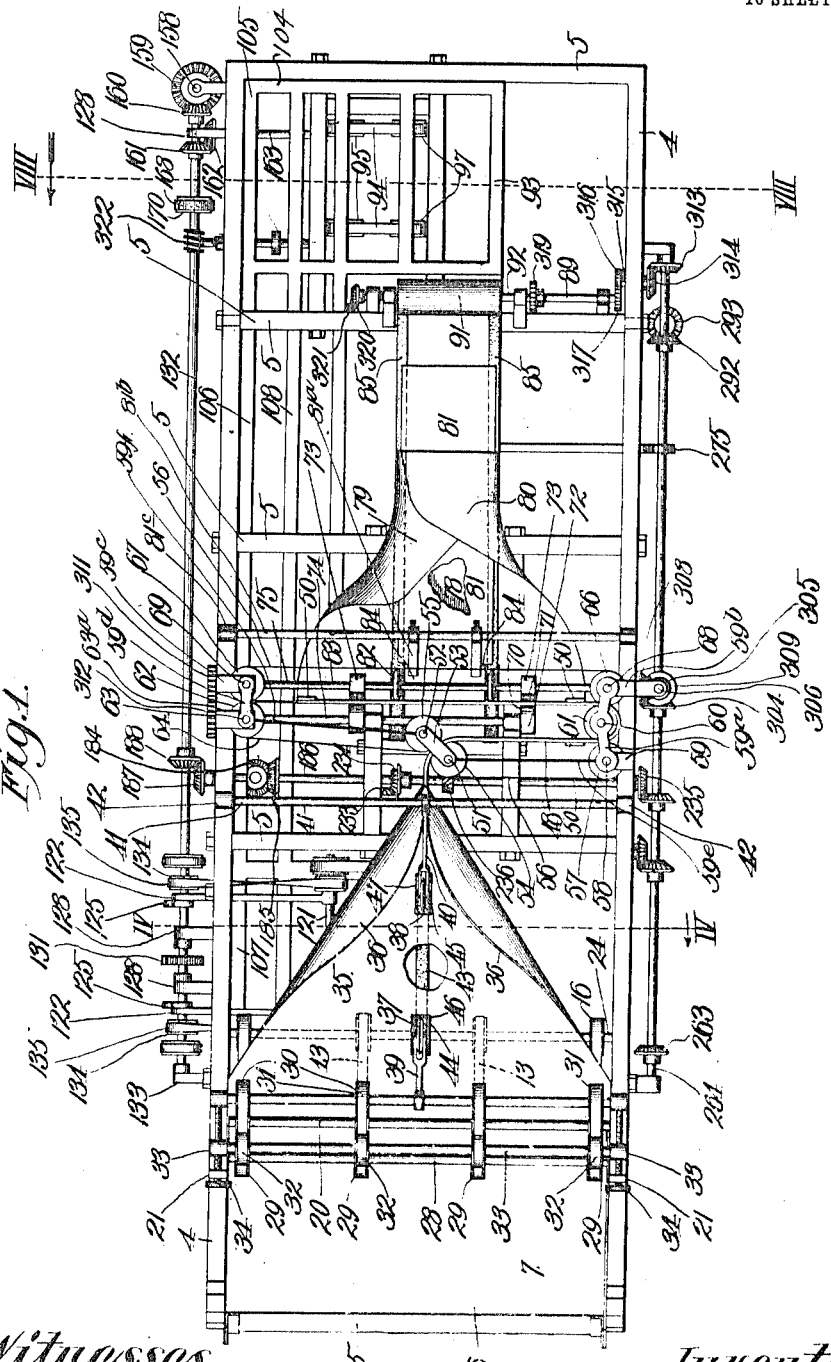

W. B. McNAMARA.
PAPER FOLDING MACHINE.
APPLICATION FILED APR. 26, 1909.
1,063,993.
Patented June 10, 1913.
10 SHEETS—SHEET 3.
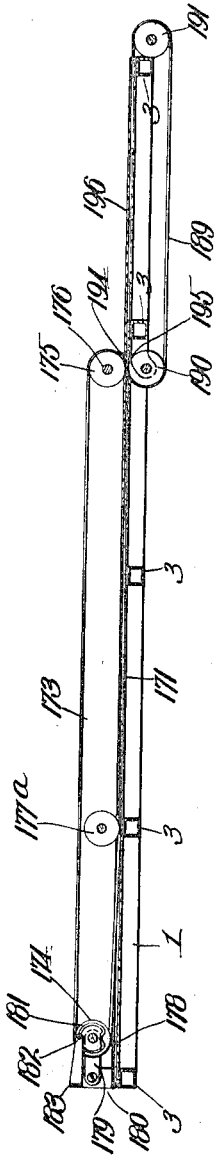
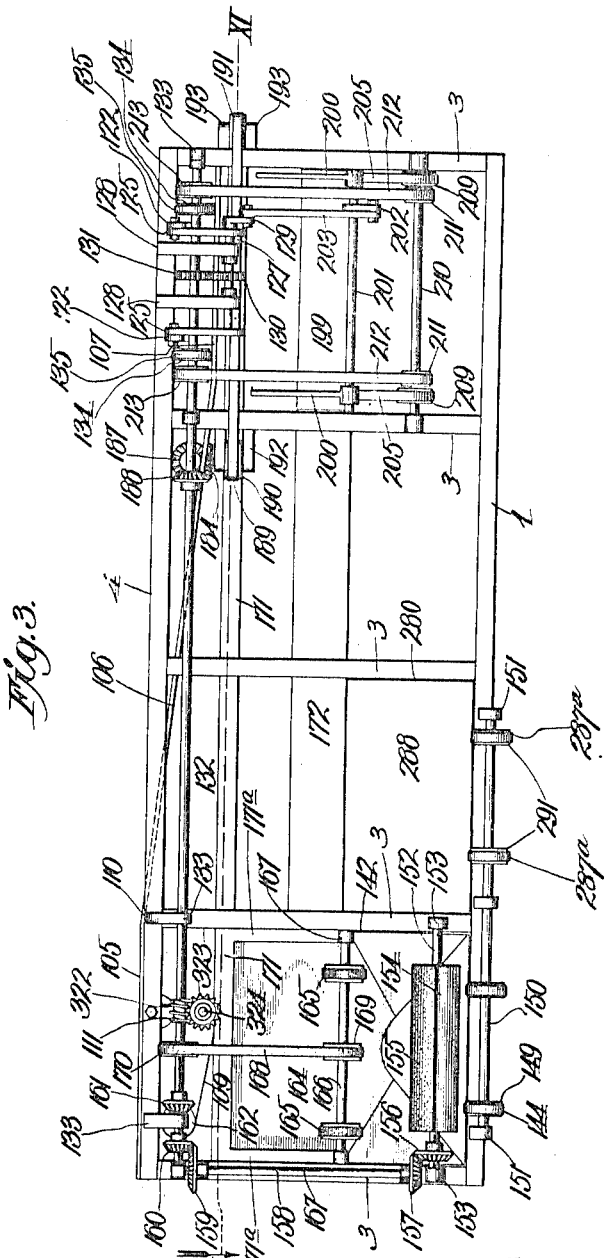
Witnesses
Frank R Glor
M. A. O'Donnell
Inventor
W. B. McNamara
By George H. Loope Atty

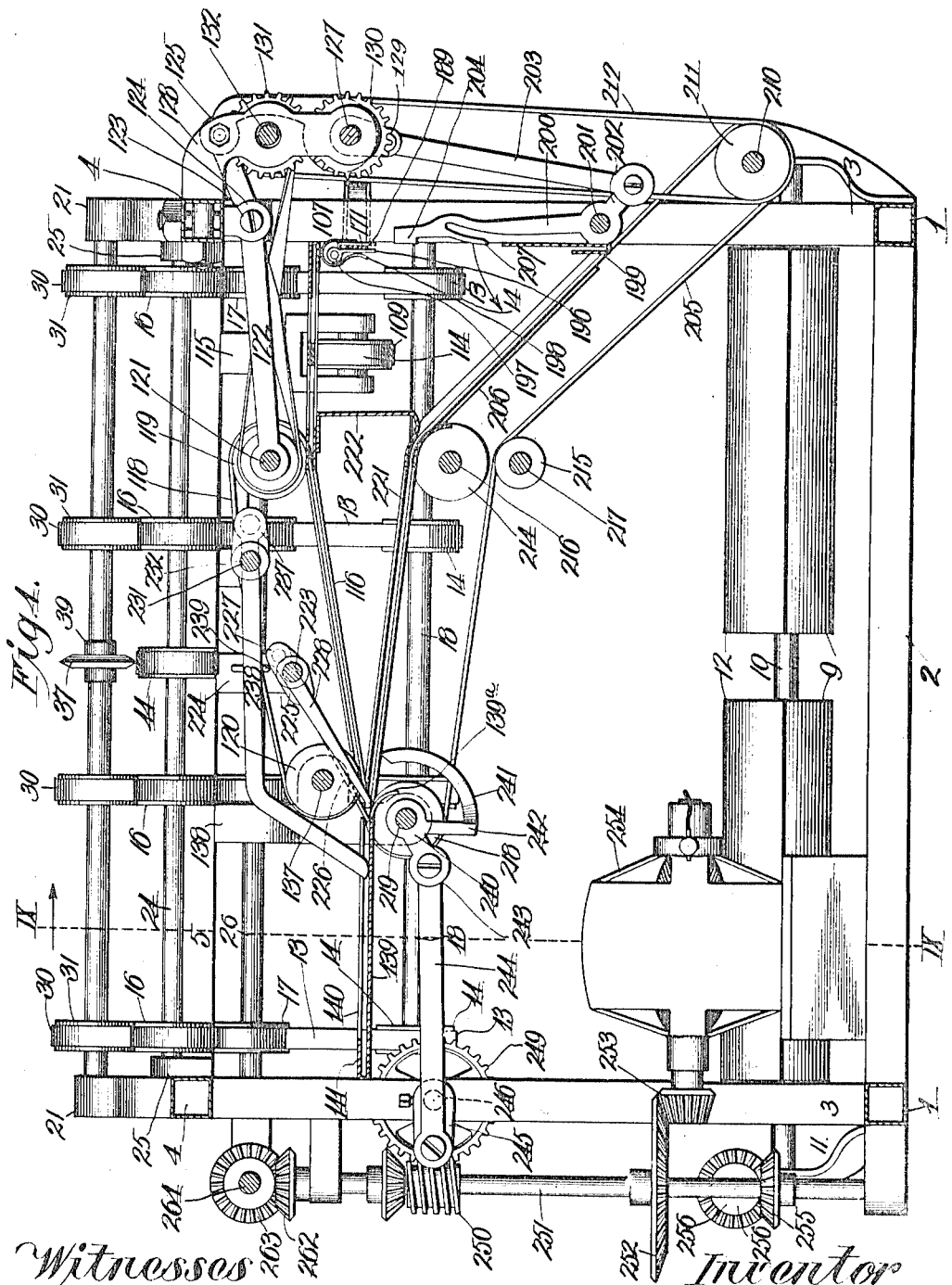

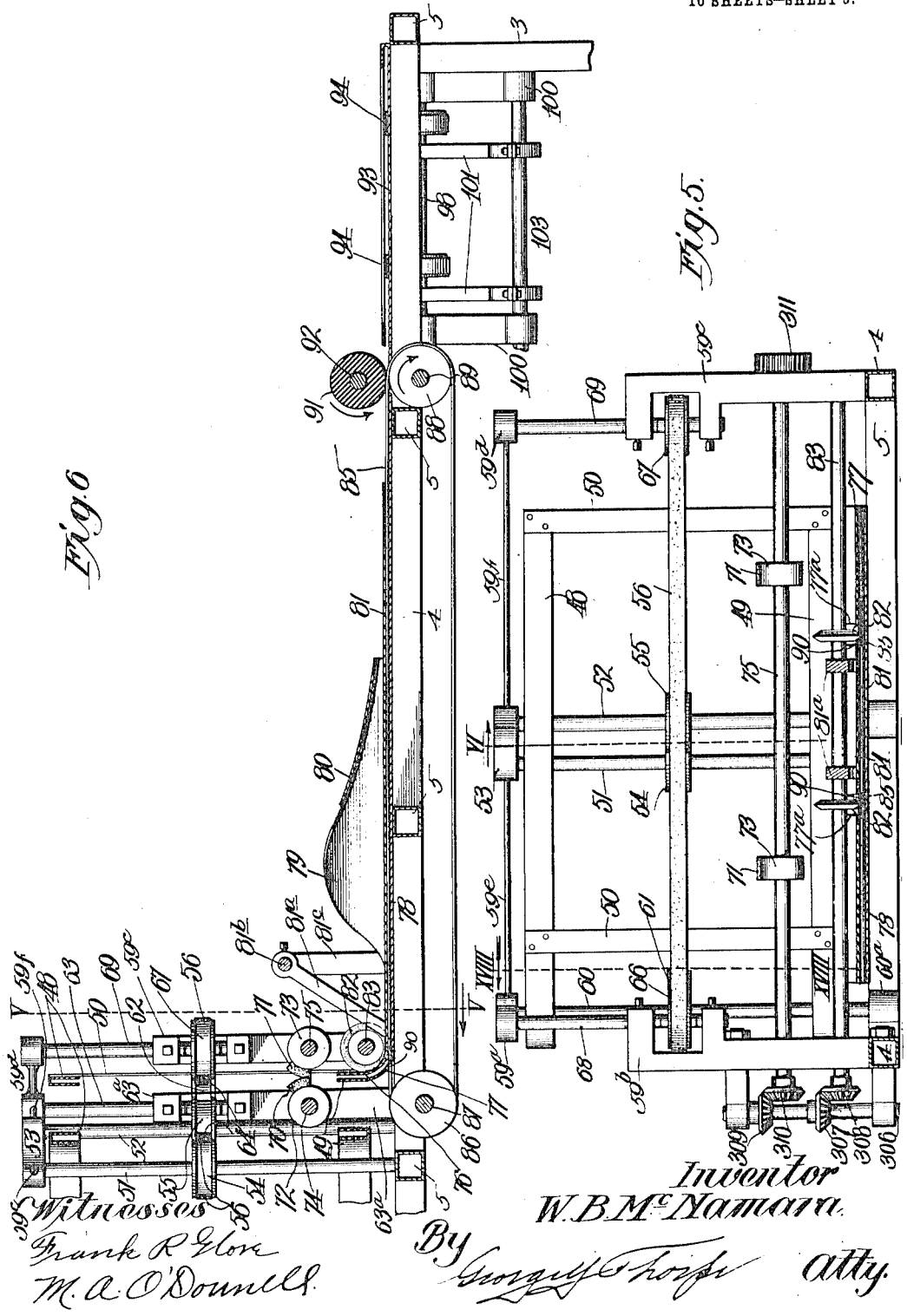

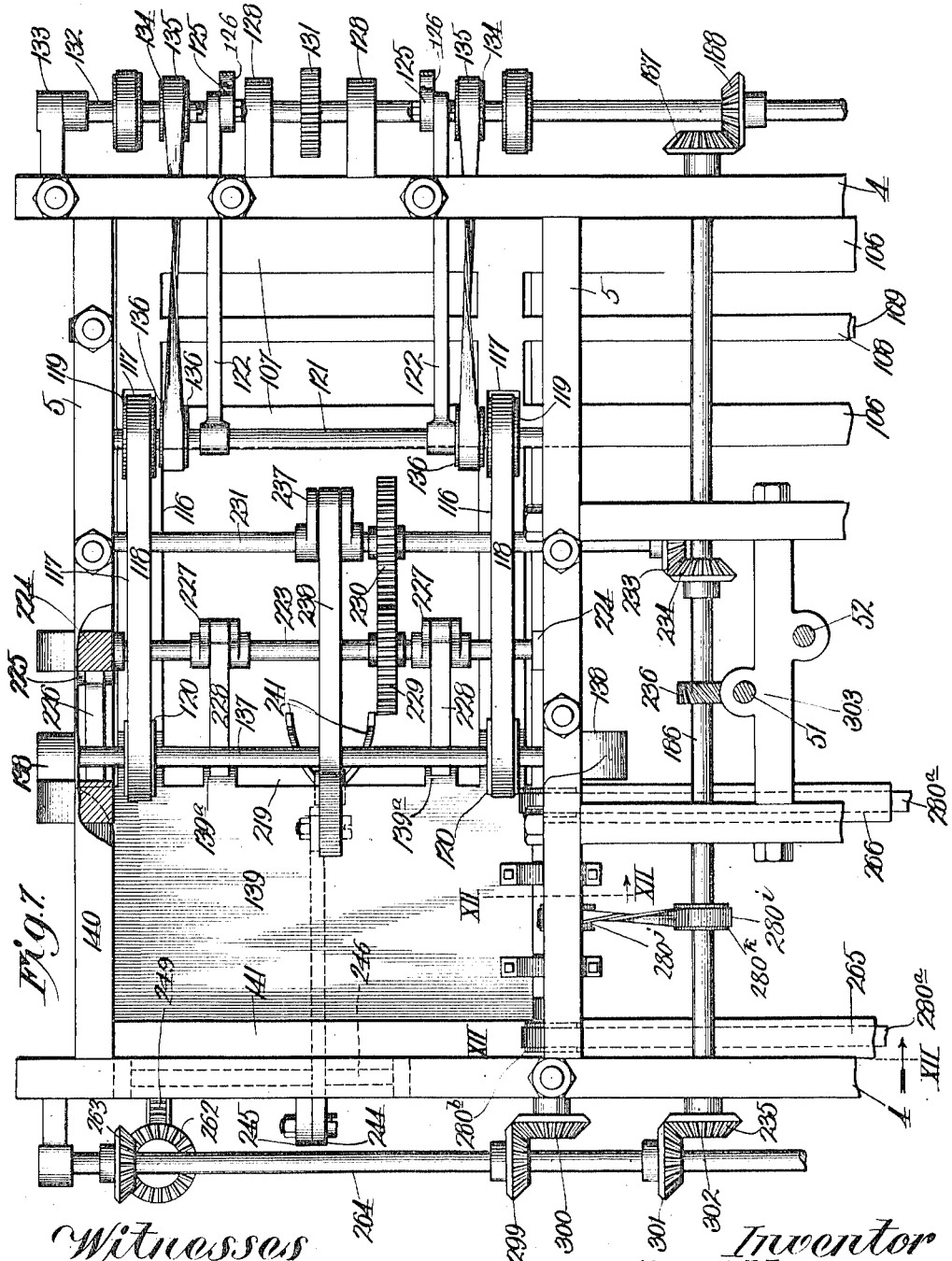

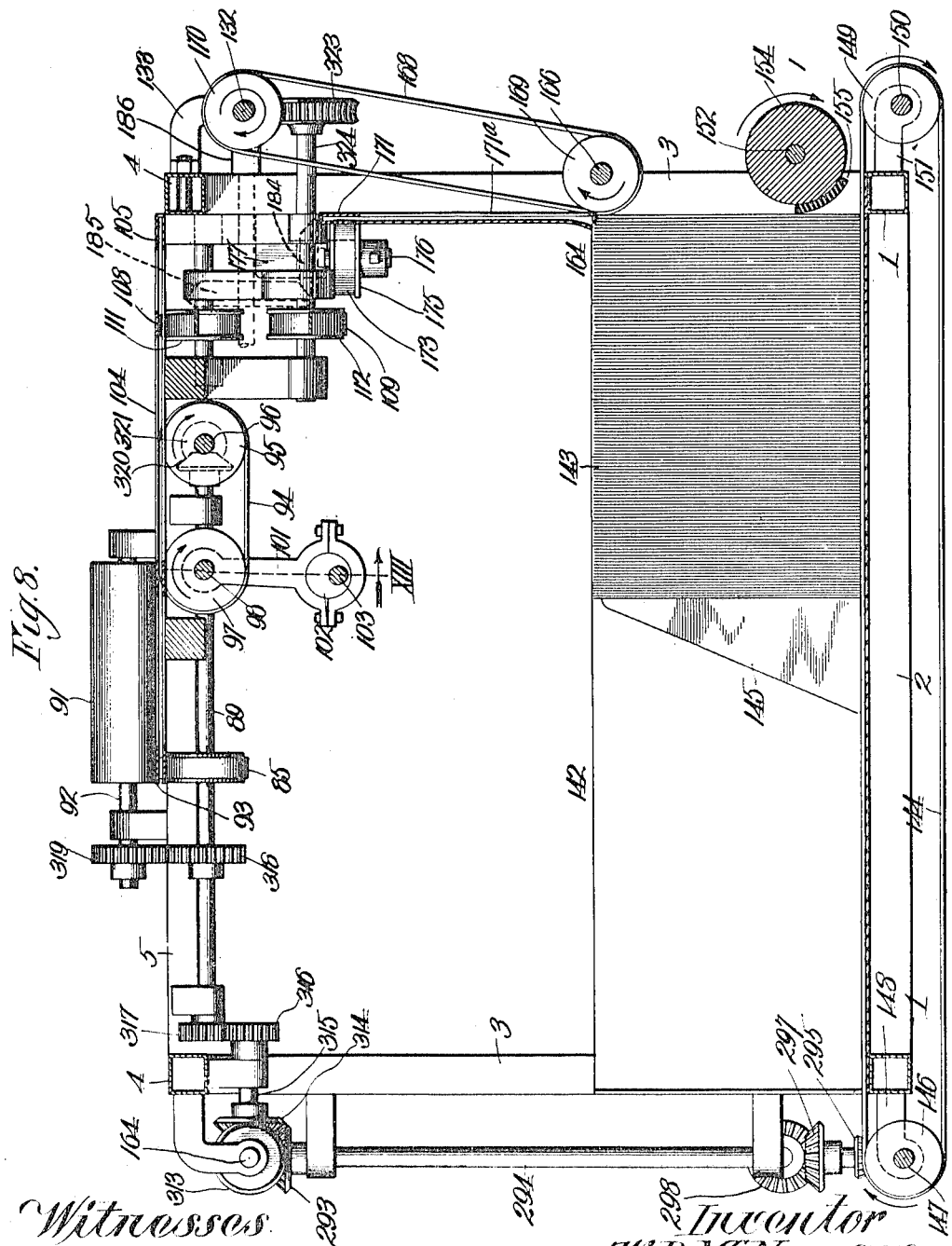

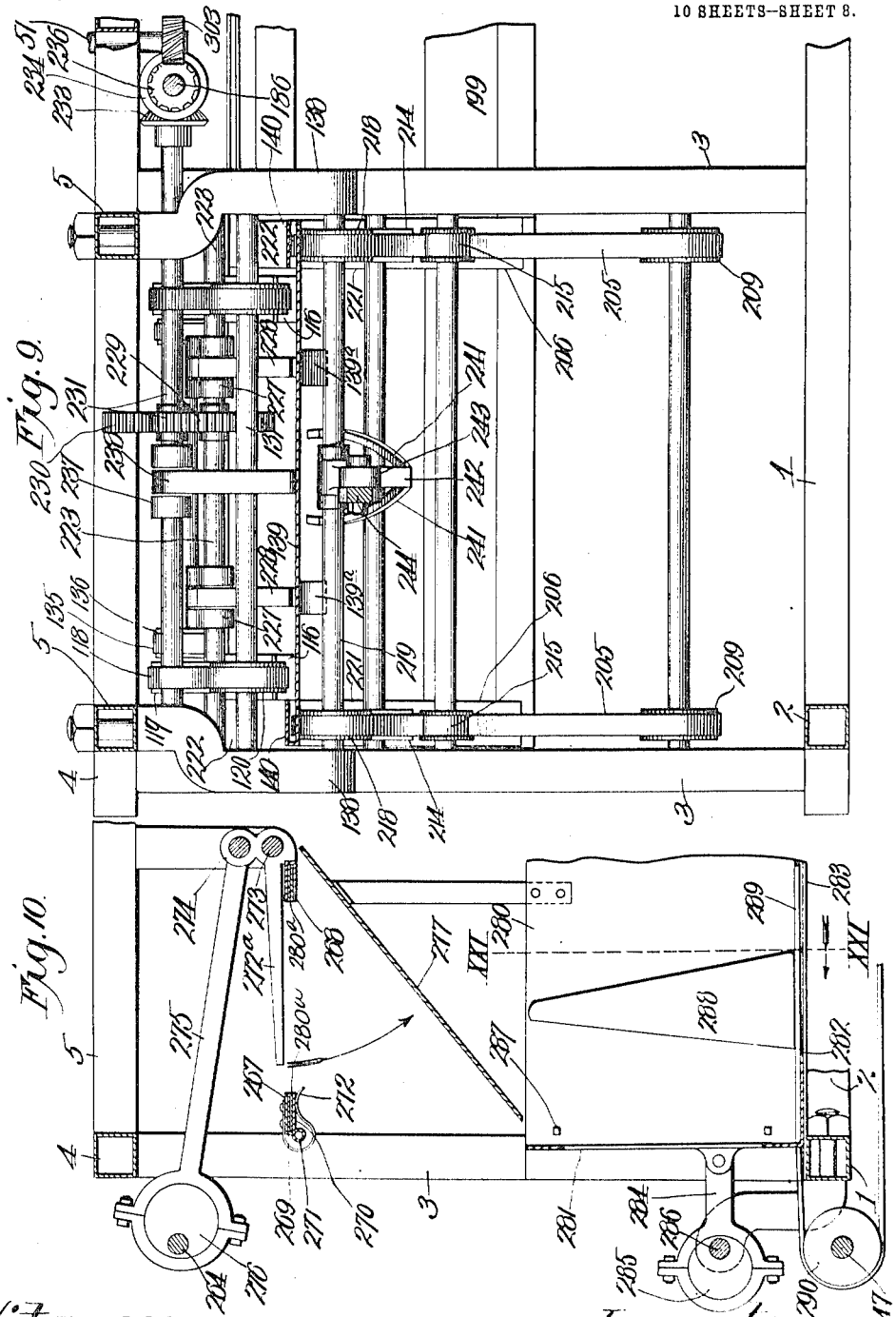

W. B. McNAMARA.
PAPER FOLDING MACHINE.
APPLICATION FILED APR. 26, 1909.
1,063,993.
Patented June 10, 1913.
10 SHEETS—SHEET 9.
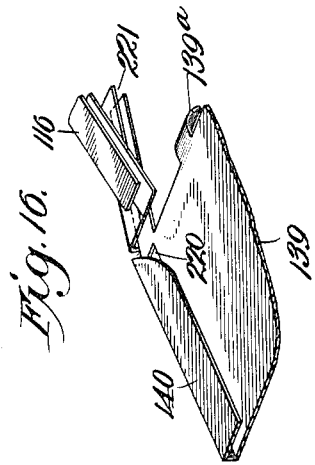
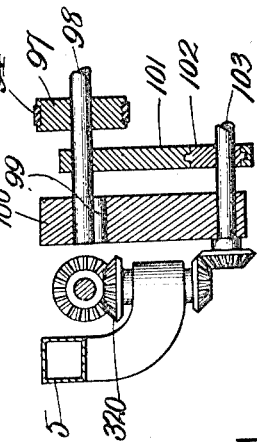
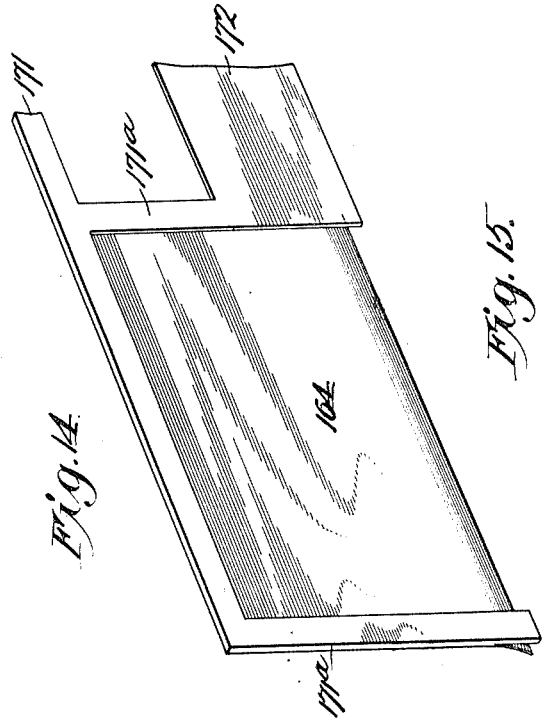
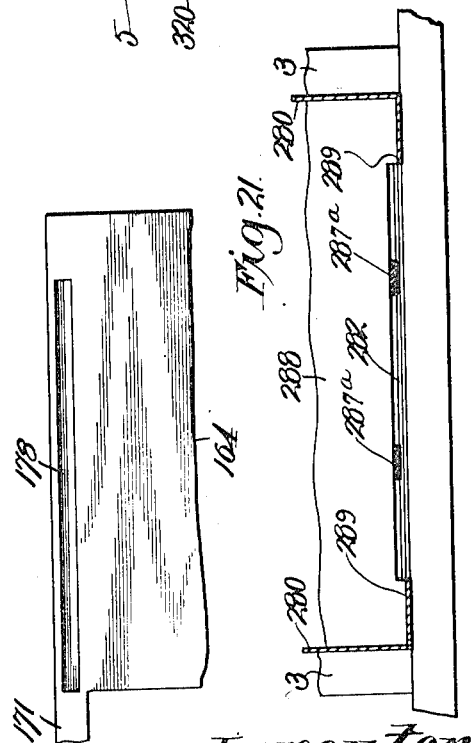
Witnesses
Frank R Glor
M. A. O'Donnell
Inventor
W. B. McNamara
By George L. Thorpe Atty.

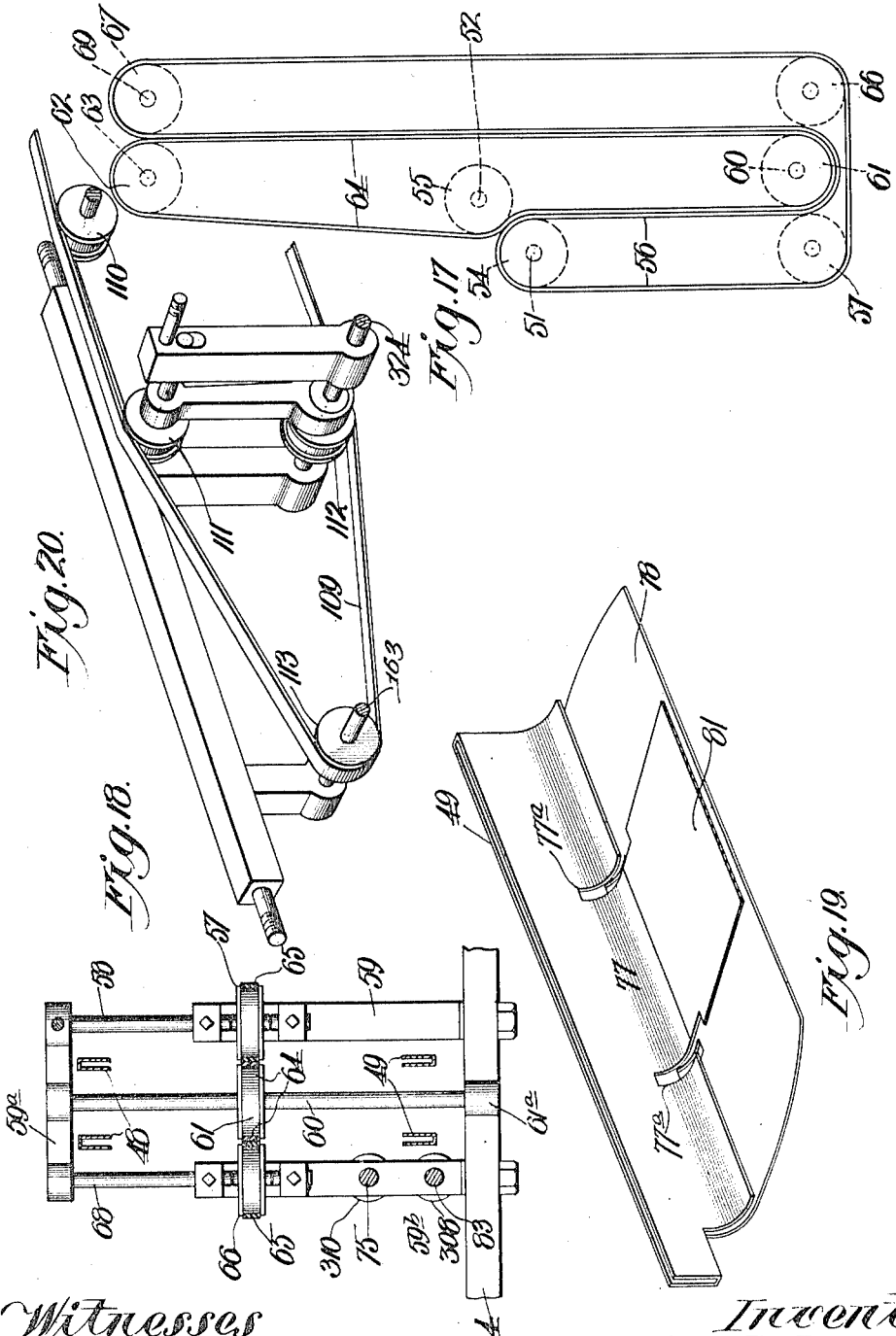

UNITED STATES PATENT OFFICE.

WILBUR B. McNAMARA, OF KANSAS CITY, MISSOURI.

PAPER-FOLDING MACHINE.

1,063,993. Specification of Letters Patent. Patented June 10, 1913.

Application filed April 26, 1909. Serial No. 492,408.

*To all whom it may concern:*

Be it known that I, WILBUR B. McNAMARA, a citizen of the United States, residing at Kansas City, in the county of Jackson and State of Missouri, have invented certain new and useful Improvements in Paper-Folding Machines, of which the following is a specification.

This invention relates to paper-folding machines and my object is to produce a machine of this character which will accurately fold sheets of paper efficiently, reliably and expeditiously.

A still further object is to produce a machine of the character outlined of simple, strong, durable and comparatively inexpensive construction.

With these and other objects in view, as hereinafter appear, the invention consists in certain novel and peculiar features of construction and organization as hereinafter described and claimed; and in order that it may be fully understood reference is to be had to the accompanying drawings, in which:—

Figure 1, is a top plan view of a machine embodying my invention. Fig. 2, is a side elevation of the same. Fig. 3, shows a view of the opposite side of the lower portion of the machine, from that shown by Fig. 2. Fig. 4, is an enlarged cross section taken on the line IV—IV of Fig. 1 with the first folder omitted. Fig. 5, is a cross section of a part of the machine taken on the line V—V of Fig. 6. Fig. 6, is a central vertical section taken on the dotted line VI of Fig. 5. Fig. 7, is an enlarged plan view of the front end of the machine with certain parts omitted and partly broken away. Fig. 8, is a cross section taken on the line VIII—VIII of Fig. 1. Fig. 9, is an enlarged cross section on the line IX—IX of Fig. 4. Fig. 10, is a cross section of a part of the machine on the line X—X of Fig. 2. Fig. 11, is a fragmentary horizontal section on the line XI—XI of Fig. 3. Fig. 12, is an enlarged vertical fragmentary section on line XII—XII of Fig. 7 at the front or receiving end of the folded-envelop conveyer. Fig. 13, is a fragmentary vertical section on line XIII of Fig. 8. Fig. 14, is an enlarged perspective view of part of the mechanism shown by Fig. 14. Fig. 15, is a view of the opposite side of part of the same. Fig. 16, is an enlarged perspective view of part of the mechanism whereby the folded sheet is inserted in the envelop. Fig. 17, is an enlarged plan view of the belts for transferring the sheet from the first to the second folding mechanism. Fig. 18, is an enlarged vertical section on the line XVIII—XVIII of Fig. 5. Fig. 19, is an enlarged perspective view of a portion of the lower guide way for the sheet in its first fold and of a part of the mechanism for effecting the second fold. Fig. 20, is an enlarged perspective view of a part of the second course-changing feed mechanism of the completely folded sheet. Fig. 21, is a vertical section on the line XXI—XXI of Fig. 10.

In the said drawings a frame comprises a pair of parallel base bars 1, a series of cross bars 2 connecting the same, a series of vertical uprights 3 erected upon the base bars, a pair of parallel top-bars 4 arranged parallel with and vertically above bars 1 and mounted upon uprights 3 and connected by suitable cross bars 5.

Arranged at the front end of the frame and supported in any suitable manner, is a feed box 6 having its bottom 7 pitched downward and rearward and open at its rear side so that sheets of paper 8 arranged therein shall gravitate downward and rearward and thus insure frictional contact of the rearmost sheet with a transverse sectional roller 9 mounted upon a cross shaft 10 journaled in bearing brackets 11 secured to bars 1, the said roller being equipped with a friction pad or shoe 12 to impart upward sliding movement to the sheets as they are successively encountered. Above the sectional feed roller 9, the rearmost sheet engages a plurality of belts 13, each of said belts engaging a belt wheel 14, a belt wheel 15 vertically above wheel 14 and projecting above the bars 4 of the frame, a belt wheel 16 rearward of wheel 15 in longitudinal alinement with the same, and a belt wheel 17. The wheels 14 are secured rigidly on a transverse shaft 18 journaled in brackets 19, projecting from the front uprights 3. Wheels 15 are secured on a transverse shaft 20 journaled in the upright bearing arms 22 of a pair of brackets 21, mounted upon brackets 23 projecting forwardly from the main frame. The wheels 16 are mounted upon a shaft 24 journaled in bearings 25 secured to side bars 4. The wheels 17 are mounted on a shaft 26 journaled in brackets 27 projecting from the front uprights 3. The brackets 21 are also equipped to form journals for shafts 28 provided with a series of belt wheels 29 arranged forward of and adjacent to wheels 15, and said wheels 29 are connected by belts 30 with a corresponding series of wheels 31 also bearing a similar journaled relation to brackets 21 and arranged above and slightly rearward of wheels 15 so that the lower strands of belts 30 shall curve around wheels 15 at the outer sides of belts 13 engaging the same, to coöperate with the last-named belts in causing each sheet of paper to move upward between wheels 15 and 29 and then rearwardly in a horizontal direction between wheels 15 and 31, belts 30 being held at the desired tension by means of belt-wheels 32 bearing a journaled relation to brackets 33 mounted upon brackets 21 and adapted to be longitudinally adjusted upon the latter by screw rods 34 carried by brackets 21 as shown in Fig. 1. Each sheet as it passes rearwardly upon the feed belts 13 is conducted into the flaring mouth of a sheet metal folder, consisting of a horizontal V-shaped bottom 35 equipped at its converging margins with upwardly and inwardly curved side walls 36, terminating at their ends a distance apart barely exceeding the width of two thicknesses of paper so that the sheet of paper shall be effectively folded or doubled as it emerges from the folder between said walls. For the purpose of facilitating the proper and accurate folding of the sheet along its longitudinal center, I provide a pair of sharp edged creasing wheels 37 and 38, the former being journaled in a bifurcated arm 39 pivoted on the shaft of wheels 31. Creasing wheel 38 is journaled in the bifurcated low end of an arm 40 pivoted on a cross-rod 41 mounted in vertical standards 42 upon side bars 4, these creasing wheels being disposed vertically above and engaging a conveyer belt 43 engaging pulleys 44 and 45 projecting up into openings 46 and 47 in the bottom of the folder. Said belt comes into frictional engagement with each sheet at the points where the former projects upward through the openings 46 and 47 so as to feed the paper positively through the folder and is driven through the rotation of belt wheel 44 mounted rigidly on the shaft 24, wheel 45 being driven through the movement of said belt 43, and the creasing wheels are held down in operative position through the force of gravity. Registering with the vertical slot formed by the adjacent rear ends of the walls of the folder is a pair of guideways 48 and 49, both being U-shape and the former inverted. The inverted guideway receives the adjacent upper edges of the folded sheet and the non-inverted guideway receives the lower or doubled edge of the sheet, the said guideways describing a one-quarter circle adjacent to the discharge end of the folder and then extending in a direct line to the right where they are bent to semicircular form and then extend transversely toward the opposite side of the frame and terminate at a suitable distance therefrom as shown most clearly in Figs. 1 and 5, and said guideways are connected together by the vertical tie-bars 50.

51 and 52 are vertical shafts arranged respectively at the concave and convex sides of the quadrant-shaped portion of the guideways and journaled at their upper ends in a bar 53 bridging guideway 48 and supported and braced as hereinafter explained, and mounted upon said vertical shafts respectively and centrally between the guideways are belt wheels 54 and 55.

56 is a belt bent to substantially U-form and at one end engaging belt wheel 54. From the same the belt extends to the right with its rear side in the vertical plane of that portion of the guideways connecting their quadrant and semicircular or return bends, the front side of the belt engaging a belt wheel 57, and the rear side extending around a belt wheel 61 in the vertical plane of the semicircular or return-bend portions of the guideways. The other strand of the belt extends directly rearward from belt wheel 57 to a belt wheel 66 at the opposite side of the belt wheel 61 from belt wheel 57 and from said wheels 61 and 66 the belt extends transversely to the left-hand side of the machine and engages a belt wheel 67 with one strand in the vertical plane of that portion of the guideways extending from the semi-circular portions to the left beyond the vertical plane of the longitudinal center of the machine. A belt 64 at one end engages belt wheel 61 and at such end is interposed between said wheel and the portion of the first-named belt described as engaging said wheel. The opposite end of belt 64 engages a belt wheel 62 on shaft 63 and between said belt wheels 61 and 62, belt 64 engages belt wheel 55 and from said wheel to wheel 61 bears frictionally against the belt 56 where it connects wheels 54 and 61. The rear strand of belt 64 between wheels 61 and 62 engages the front strand of that portion of belt 56 connecting wheels 66 and 67.

The shafts 58, 60 and 68 are journaled at their upper ends in a bar 59ᵃ, shaft 60 being also suitably journaled at its lower end in a bearing lug 60ᵃ of the adjacent cross bar 5, see Fig. 5. The lower ends of shafts 58 and 68 are journaled in standards 59ᵃ and 59ᵇ, rising from the adjacent top bar 4. Shafts 63 and 69 are journaled at their upper ends in a bar 59ᵈ and at their lower ends in standards 59ᶜ rising from the other top bar 4. 59ᵉ and 59ᶠ are brace bars extending inwardly from bars 59ª and 59ᵈ respectively to bar 53 to brace and support the latter as shown in Figs. 1, 5 and 6, it being of course understood that any other suitable means for supporting the various vertical shafts of the sheaves or guide wheels for belts 56 and 64 may be resorted to.

As the folded sheet attains a position in the rear parts of guideways 48 and 49 with its vertical edges behind the bars 50, it is engaged by the friction shoes 70 and 71 of a pair of rollers 72 and 73 respectively mounted on a pair of transverse shafts 74 and 75 in a horizontal plane just above the lower or U-shaped portion of the guideway 49, which portion of the guideway is provided with an opening 76 in its bottom to permit said rollers to force the folded sheet downwardly and rearwardly through the curved guideway 77 onto the bottom 78 of the second folder, said bottom diminishing in width to within a short distance of its rear end and being formed with folding wings 79 and 80, the former below the latter.

The wings 79 and 80 are of sufficient width to bridge the reduced portion of the bottom of the folder and project upward from the side margins of the bottom of the latter and converge downwardly and rearwardly for the purpose of forming a double fold in the previously folded sheet, at right angles to the first fold, the wing 79 projecting farther forward than wing 80 for the purpose of starting its fold first so that the fold made by wing 80 shall overlie it, the sheet after being thus doubly folded being adapted to easily pass into an ordinary envelop, and in order to compel the sheet as it passes through said folder to be doubly folded as described in lines parallel with each other, a narrow forming plate 81 extends longitudinally through the folder and is supported by a pair of arms 81ª rigidly carried by and extending downward and forward from a cross rod 81ᵇ carried by a pair of standards 81ᶜ upon bars 4 of the frame. Plate 81 is arranged just above and parallel with the bottom of said folder with its side margins almost in contact with the sides of the contracted portion of the folder and in vertical alinement with a pair of creasing wheels 82 journaled on a transverse shaft 83 in the vertical plane by preference, of shafts 68 and 69, the front end of the forming plate 81 being reduced as at 84 so as to project forwardly between said creasing wheels, which also depend through slots 77ª in the curved guideway 77, and in order to convey the folded sheet through said folder below the forming plate, preliminary to and during the double folding operation, a pair of longitudinally-extending and horizontally-arranged belts 85 extend through the folder along the side edges of the forming plate and engage at their front ends belt wheels 86 mounted on a suitably journaled transverse shaft 87, and at their rear ends engage belt-wheels 88 mounted on a transverse shaft 89, also journaled in any suitable manner, it being noticed that the lower portion of the curved guideway 77 is cut away at 90 to accommodate the upper strand of belts 85 and that such belts engage belt wheels 88 beyond the rear end of the bottom of the folder and that as the folded sheets are carried by said belts beyond the rear end of the folder and off the rear end of the forming plate, such sheets are engaged by a roller 91 mounted on a shaft 92 suitably journaled. As the folded sheet is fed rearwardly by the coöperating belts 85 and roller 91, it passes into a skeleton longitudinally-extending and horizontally-arranged guideway 93. As it reaches the rear end of said guideway it is engaged by a pair of belts 94, and moved at right angles to its former course laterally out of guideway 93 and toward the left side of the machine, the belts 94 being mounted upon belt wheels 95 secured on a longitudinally extending shaft 96 suitably journaled, and belt wheels 97 secured upon a short longitudinal shaft 98 fitting at its ends in the vertical slots 99 (see Fig. 13) of a pair of hangers 100 depending from the frame.

101 indicates a pair of eccentric straps forming a journal for shaft 98 and raised once in each revolution by the eccentrics 102, mounted on a short shaft 103, journaled in the hangers 100, the said eccentrics being adapted once in each revolution, to raise shaft 98 just at the moment the folded sheet attains the rear end of guideway 93 for the purpose of pressing the belts 94 upwardly against the sheet and feeding it laterally as hereinbefore referred to, the mechanism identified by reference characters 96 to 103 inclusive being referred to hereinafter as course-changing feed mechanism. As said course-changing feed mechanism engages the folded sheet it causes it in its lateral travel, to move through a laterally extending horizontal guideway 104 and as it is released by said course-changing feed mechanism it is engaged and started toward the front end of the machine at the left hand side of the same through a guideway by a second course-changing feed mechanism, said guideway comprising the short horizontal longitudinally extending portion 105 at the rear end of the machine, a downwardly and forwardly longitudinally-extending portion 106, and a short horizontal longitudinally-extending portion 107, at the frone end of the machine, said guideway being supported in any suitable manner and embodying a central longitudinally-extending bar 108 located between the sides of the guideway portions and corresponding in form in side view to the same, said bar being disposed in the plane of the upper sides of the guideway portions and overlying the upper strands of a longitudinally extending belt 109 of the last-named course-changing feed mechanism, the said belt being so arranged that it is bent to correspond to said bar and the guideway in order to hold the folded sheet pressed against the upper sides of the guideway portions and feed it positively and reliably forward through the said guideway, it being noticed by reference to Fig. 20, that an idler roller 110 is employed to impart the arch or upward bend to said belt, the bend at the front end of the inclined pitched portion of the guideway being imparted to the belt by the overlying bar 108. To the front of roller 110 is a guide roller 111 and an underlying guide roller 112, which rollers are engaged by said belt 109, the said belt also engaging a roller 113 at the rear end of the machine and a roller 114 at the front end of the machine journaled in the hanger 115 depending from the front cross bar 5 of the frame.

The guideway portion 107 opens at its inner side into a guideway 116 pitched downwardly and toward the right-hand side of the machine, the upper part of said guideway being slotted as at 117 to receive the lower strands of a pair of feed belts 118 and the belt wheels 119 and 120 engaged by said belts, the wheels 119 being mounted on a shaft 121 journaled in and forming a part of a swing frame, which also embodies a pair of swing bars 122 fulcrumed at 123 in brackets 124 depending from the left-hand top bar 4 of the frame. The opposite ends of the bars 122 of the swing frame are pivotally connected to eccentric straps 125 mounted on eccentrics 126 of a longitudinally extending shaft 127, journaled in hangers 128 and provided at one end with a crank-arm 129 and connected by a gear wheel 130 to the gear wheel 131 on a shaft 132 extending longitudinally for nearly the full length of the machine and journaled in bearings 133 projecting from the frame, said shaft being equipped with a pair of belt wheels 134 connected by crossed belts 135 to belt wheels 136 on shaft 121 to rotate the latter and hence belt wheels 119, which wheels impart movement to belts 118 and belt wheels 120 on shaft 137 journaled in hangers 138 depending from the frame, the arrangement being such that the eccentrics through the instrumentality of links 125 operate the rock frame at the moment the folded sheet attains the front end of the guideway portion 107 so as to cause the belts 118 to press the front end of said sheet downward and feed it toward the right-hand side of the machine through the guideway 116, and then into a short horizontal guideway consisting of a bottom plate 139, transverse plates 140 overlying and spaced from the ends of plate 139 and a longitudinal plate 141 overlying and spaced from the right-hand edge of plate 139, it being understood in this connection that the words right and left are used always with reference to one standing at the front end or the end of the machine where the sheets are introduced and looking toward the rear end. Just before a folded sheet passes through the guideway 116 as explained, an envelop as hereinafter explained, enters the short horizontal guideway for the purpose of receiving the folded sheet.

At the rear end of the machine is a transverse receptacle 142, for receiving a stack of inverted envelops 143 and extending through said receptacle are the upper strands of a belt conveyer 144 upon which the stack of envelops rest, the said conveyer carrying an upwardly projecting block 145 within the receptacle to follow and press against said stack for the purpose of holding them firmly together and the most advanced one, viz., that nearest the left-hand side of the machine, in position to be engaged by a feeding device hereinafter referred to. The belts of said conveyer are mounted at their right-hand ends upon belt wheels 146 on shaft 147 journaled in bearings 148 of the frame, and the opposite ends of said belts are mounted upon belt wheels 149 on a shaft 150 journaled in bearings 151.

In a plane above shaft 150 is a short shaft 152 journaled in bearings 153 rigid with the frame and equipped with a roller 154 for successive engagement with the envelops of the stack to slide them vertically upward one at a time, said feed roller having a rubber or equivalent friction pad 155, to insure a positive feed of the envelops. The shaft 152 is provided with a gear wheel 156 meshing with a gear 157 on a suitably journaled vertical shaft 158, provided at its upper end with a gear wheel 159, meshing with a gear 160 on shaft 132, the last-named shaft being also equipped with a gear 161 engaging a gear wheel 162, on the shaft 163, of belt wheel 113.

164 is a vertical plate extending longitudinally of the machine above the stack of envelops and just inward of the vertical plane in which the envelops are successively fed upward by the feed roller 154, the lower end of said plate being flared inwardly slightly so that the envelops shall not catch upon it but shall pass upward at the outer side of said plate until engaged by the rubber-tired or friction wheels 165, on a shaft 166, journaled at its ends in bearings 167, carried by the adjacent uprights of the frame, said shaft being driven in the direction indicated by the arrow, Fig. 8, through the medium of the belt 168, engaging a belt wheel 169 on shaft 166, and a belt wheel 170, on shaft 132. It will thus be seen that just before the feed roller releases the envelops, the latter are engaged by the friction rollers 165 and are continued in their upward movement until their upper edges enter the inverted U-shaped guideway 171, which extends from one end of the machine to the other, a pair of vertical plates 171ª depending from the rear side of guideway 171 and overlapping the ends of each envelop as it travels upward to insure that such envelop enters the guideway 171. A U-shaped guideway 172 is arranged vertically below guideway 171 and extends from the advanced end of the envelop to the front end of the machine to receive each envelop as the latter after entering the rear end of the guideway 171, is started forward toward the front end of the machine, it being noticed by reference to Fig. 8, that the feed rollers 165 release the envelops just before the upper margins of the latter come into contact with the bridge or top portion of the guideway 171, a feed belt 173 firmly engaging said envelops and pressing them rearwardly against the rear side of said guideway 171, to start them on their forward movement at the instant they are released by said feed rollers 165. Said feed belt 173 engages a belt wheel 174 at the rear end of the machine and a belt wheel 175 at a suitable distance from the front end of the machine, journaled on the stub shaft 176 carried by a bracket 177 (see Fig. 8), secured to the frame in any suitable manner. The rear strand of the belt 173 in the vertical plane of the advanced ends of the envelops, engages an idler roller 177ª and from said roller to roller 175 extends through guideway 171 and against the front wall thereof, that portion of the rear strand of the belt between wheels 177 and 174 occupies a slot 178 in the rear wall of the guideway and is adapted for the greater part of the time to extend in alinement with the remainder of such strand, but at regular intervals is swung forwardly so as to occupy the angular position shown in Fig. 11, for the purpose of permitting the upper edges of the envelops to enter the overlying guideway 171 between said angular portion of the belt and the rear wall of said guideway. To impart this swinging or oscillatory movement to said portion of the belt, the wheel 174 is journaled on a swing arm 179 pivoted on a bracket 180 rigid with the frame, and the wheel 174 is provided with a cam groove 181 in its upper side engaged by the pin 182 of an arm 183 of bracket 180, and motion is imparted to the belt 173 through the medium of a bevel gear 184 meshing with a bevel gear 185 on a transverse shaft 186, journaled in the frame and provided with a bevel gear 187 meshing with a bevel gear 188 on shaft 132.

To continue the movement of each envelop in a forward direction as it is about to pass beyond the sphere of action of belt 173, I provide an endless belt 189 to be driven by friction with belt 173, and mounted on belt wheels 190 and 191 journaled between supporting brackets 192 and 193 carried by the frame, the walls of guideway 171 being provided with openings 194 and 195, the former to accommodate belt 173 and the latter to accommodate belt 189, the front strand of which extends through the guideway through opening 195 and travels against the rear wall of said guideway so as to hold the envelops pressed against the opposite portion of the front wall of the guideway which opposite portion 196 is hingedly supported at its upper end as at 197 to the bridge portion of the guideway, and is held pressed rearwardly toward the belt by a spring 198 as shown clearly in Fig. 4, the hinged portion 196 of the guideway being of substantially the same length as and opposite the rear end of belt 189.

The guideway 172 is provided with an extension 199 of equal length and underlying portion 196 of guideway 171, and is secured rigidly to a pair of rock arms 200 secured on and projecting upward from a short shaft 201, suitably journaled in the frame. Arms 200 are disposed rearward of the opposite ends of the envelops when occupying the extension 199 of the guideway 172 and bear against the portion 196 of the guideway 171, and one of said arms 200 is provided with a crank 202, pivotally connected by a link 203 with the crank arm 129 of shaft 127 hereinbefore described, so that once in each revolution of said shaft said arms 200 are caused to swing forwardly as indicated by the arrow, Fig. 4. In this movement the extension 199 partakes, so as to assist in swinging the envelop in the same direction, the forwardly projecting portions 204 of arms 200, pressing against the envelop near its upper edge with sufficient force to overcome the resistance of the weak springs 198 and swing the hinged guideway portion 196 out of the way. This movement continues until the envelop is pressed firmly upon the upper strands of the belts 205 occupying the vertical plane of arms 200, the upper strands of said belts running on a pair of angle plates 206, so as to offer the proper resistance to the pressure of the envelop and feed the same forwardly between said angle plates. It will be noted in this connection that the arms 200 are provided at their front sides with downwardly disposed hooks 207, which engage the envelop forward of their flaps so that as the envelop is moved forward by said belts 205, the flaps shall pass into said hooks in order that said arms as they swing back to their original positions, may swing the flaps open, the movement of the envelop of course coöperating in such result and compelling the flaps to be opened sufficiently wide to compel them to trail behind the envelop in the continued movement of the latter. The belts 205 at their rear and lower ends engage a pair of belt wheels 209, mounted on a shaft 210, journaled in the frame, and said shaft is equipped with belt wheels 211 connected by belts 212 to a pair of drive belt wheels 213 on shaft 132.

The belts 205 extend upwardly and forwardly from wheels 209, the upper strands of said belts running over a pair of belt wheels 214 and the lower strands over belt wheels 215, journaled respectively on suitably supported shafts 216 and 217. From the guide wheels 214 and 215 the belts extend forwardly and engage wheels 218 on a shaft 219 suitably journaled in hangers 138, the upper portions of said belt wheels 218 projecting slightly upward through notches 220 in the rear edge of plate 139, so that the envelop shall be fed by said belts onto plate 139, it being noticed by reference to Fig. 4, that the upper strands of belts 205 between wheels 214 and 218 extend through parallel guideways 221, for the envelops. The said guideways are supported in any suitable manner, Fig. 4 showing that their rear ends are flared to properly receive the envelops fed thereto by the portions of the belts between wheels 214 and 209, and that the upper sides of the guideways are bent upwardly to form brackets 222 as supports for the forward ends of longitudinal guideway 107. It will thus be seen that the guideways 116 for the folded sheets and 221 for the envelops converge toward the right side for the purpose of conducting such sheets and envelops onto plate 139, it being understood that the opened flap of the envelop which trails behind its body portion in the passage through guideways 221 will project rearwardly beyond the corresponding edge of plate 139, for a purpose which hereinafter appears.

Above guideways 116 a longitudinal shaft 223 is journaled in depending portions 224 of the frame and is provided with a pair of cranks 225 to which the rear ends of a pair of wedges 226 are pivotally secured, said wedges normally resting on the plate 139 near its rear edge and being adapted to yield upwardly to the pressure of the envelop as it is forced forwardly upon said plate. The wedges are for the purpose of raising the back of the envelop near its connection with the ends of the front of the envelop to facilitate the entrance into such envelop of a folded sheet. Shaft 223 is also provided with a pair of oppositely projecting cranks 227 to which the rear ends of a pair of push arms 228 are pivoted, said push arms resting at their free ends on plate 139 or its flaring extensions 139ª (see Fig. 4) and being adapted like the wedges, to yield upwardly to the forward passage of each folded sheet of paper that passes through the guideways 116, it being noticed that the wedges 226, one only appearing in Fig. 7, are disposed in the vertical plane of the ends of the envelop, and preferably beyond the ends of the folded sheet which will be appreciably shorter than the envelop. The function of the push arms 228 is to engage the rear edge of the folded sheet and force it forwardly after it has entered the envelop so that it shall be completely incased thereby, that is so that its rear edge shall be forward of the rear edge of the body of the envelop in order that the flap may be properly folded down upon the back and thus complete the incasement of the folded sheet. The shaft 223 is provided with a gear wheel 229, meshing with a gear wheel 230 on a parallel shaft 231 suitably journaled in depending portions 232 of the frame and provided at one end with a bevel gear 233 meshing with the bevel gear 234 on the transverse shaft 186 provided at its front end with a bevel gear 235 for a purpose which hereinafter appears, said shaft being also provided with a worm gear 236 for a purpose which hereinafter appears.

237 indicates a crank on shaft 231 disposed opposite the center of plate 139 and pivoted at its rear end to said crank is an arched finger 238 which arches over shafts 223 and 137 and rests at its front or free end upon plate 139, when no envelop is upon said plate, said finger yielding upward to the pressure of each envelop as it is forced forward on the plate. The finger is of such length that when the envelop has come in contact with the projecting portion of guideway 141, it rests on the front portion of the envelop rearward of the back portion thereof so that as shaft 231 rotates and slides said arched finger forward the latter will arch or buckle upward said back portion of the envelop and at the same time by engagement with the underlying rod 239 carried by the pendent portion 224 of the frame, will be lifted up from the front portion of the envelop so as to be out of the path of the folded sheet of paper which is forced, as hereinbefore explained, into the envelop while its back portion is buckled or arched upward as described.

240 is a rock frame journaled upon shaft 219 and provided with a fork of hook shape in side view that is to say the tines 241 of the fork extend concentrically of shaft 219 and its stem 242 extends substantially radially of said shaft. The rock frame also embodies a crank arm 243 pivotally connected by a link 244 to a crank arm 245 of a short longitudinal shaft 246, journaled in portions rigid with the frame.

Shaft 246 is provided with a worm wheel 249, meshing with and driven by a worm 250, upon a vertical shaft 251 suitably journaled in parts rigid with the frame. Said shaft is provided with a bevel gear 252 meshing with a bevel gear 253 on the armature shaft of an electric motor 254, it being obvious that any other power mechanism may be employed instead of the motor shown. Shaft 251 is also equipped with a bevel gear 255 meshing with a bevel gear 256 on a short shaft 257 journaled in bearing 258 secured in any suitable manner to the frame, and said shaft is equipped with a worm 259 meshing with worm wheel 260 secured on shaft 10 which carries the sectional feed roller 9 for feeding the sheets of paper upward, the worm 259 being incased by bearing 11 and the cap 261 secured to and forming a part of said bearing 11. 262 is a bevel gear mounted on shaft 251 and meshing with a bevel gear 263 on the longitudinally extending shaft 264 suitably journaled and adapted to transmit motion to certain other shafts as hereinafter explained.

A longitudinal guideway arranged horizontally in the plane of guideway 141 and near the right hand side of the machine, consists of two similar U-shaped members 265 and 266 (see Fig. 7) which are suitably supported in the frame and register at their rear ends respectively, with a pair of longitudinally extending guideway members 267—268, which slightly exceed in length the envelops employed, and which are disposed forward of the envelop receptacle 142. The guideway member 267 comprises an upper right-angle shaped section 269 and a lower straight member 270 hinged at its outer edge as at 271, and held pressed yieldingly upward by one or more springs 272, secured to section 269 so as to make member 270 capable of being swung downward as indicated by the adjacent arrow Fig. 10. The section 268 is a rigid section carried by the rock arm 272ª projecting to the right over the space between sections 267 and 268 and journaled on the longitudinally extending rod 273 carried by the frame, see Fig. 10, said arm 272ª being provided with a crank 274 pivotally connected to the strap 275 of an eccentric 276 mounted upon shaft 264, the arrangement being such that the eccentric once in each revolution, causes arm 272ª and the guideway section 268 carried thereby, to swing downward as indicated by the adjacent arrow, Fig. 10, the said arm 272ª in such action, engaging the upper side of the envelop containing a folded sheet and occupying guideways 267 and 268, and pressing against it with sufficient force to overcome the resistance of the spring-actuated bottom 270 of guideway 267, so as to force the envelop out of engagement with said guideway. As the eccentric swings arm 272ª upward again, the folded envelop slips out of the rear section 268 of the guideway onto the underlying chute 277, off which it slides down into the right-hand end of an underlying receptacle 280 paralleling receptacle 142. Each envelop forced out of guideway sections 267, 268, by arm 272ª as explained, is withdrawn from plate 139 and guideway section 141 by a pair of endless belts 280ª, engaging belt wheels 280ᵇ on short shaft 280ᶜ and belt wheels 280ᵈ on a suitably journaled shaft 280ᵉ. The lower strands of said belts extending through the alined guideways 265 and 267, and 266 and 268, for the purpose of pressing envelops down upon the lower sections or bottoms of said guideways, and to avoid interfering with the ejection of the envelops at the proper time through the medium of arm 272ª, as hereinbefore explained, the belt wheels 280ᵇ are disposed above the front ends of the guideways 265 and 266 and in order to avoid interfering with the proper disposition of the envelops on the plate 139, the shaft 280ᶜ is capable of a slight vertical movement in its bearings and is pivotally connected by eccentric straps 280ᶠ with eccentrics 280ᵍ on a short shaft 280ʰ suitably journaled in the frame, the rotation of said eccentrics serving once in each revolution to lift shaft 280ᶜ and hence lift the lower strands of the belts 280ª above plate 139 to permit the envelops delivered to said plate, to pass under said strands. By the time a folded sheet is arranged within the envelop and the flap is tucked between said folded sheet and the back of the envelop, the eccentrics effect the depression of shaft 280ᶜ and as a result the belts 280ª come into engagement with the said underlying envelop and carry it rearward through guideways 265 and 266 and into guideways 267 and 268, and as it attains a position in the vertical plane of receptacle 280 the arm 272ª operates as described, to force it downward onto the underlying chute, the said belts 280ª being driven in the direction indicated by the adjacent arrows, Fig. 2, through the medium of a crossed belt 280ⁱ connecting the belt wheel 280ʲ on shaft 280ᶜ with the belt wheel 280ᵏ on shaft 186. As the envelops fall into the receptacle 280, they strike against its end wall 281, which wall is provided at its lower end with a horizontal arm 282, projecting to the left and resting upon flanges 283, projecting inwardly from the lower ends of the side walls of the receptacle 280. Wall 281 is pivotally connected by straps 284 to eccentrics 285 mounted on a suitably journaled short shaft 286, the rotation of said eccentrics imparting vibratory movement to end wall 281 in the direction of the length of receptacle 280, the vibrations being sufficient to force each envelop beyond the spring detents 287, which detents upon the occurrence of the opposite movement of the wall, spring back into the receptacle 280 and prevent the envelop from being carried back with said wall through adhesion or by falling.

288 is a slide block arranged in receptacle 280 and provided with depending feet 289 resting on flanges 283 outward of the base flange 282 of wall 281 and adapted initially to be disposed adjacent to wall 281, so that the first envelop pushed past the detents by said wall will fall toward and rest against said block, the second envelop against the first and so on until the space between the detents and block is completely occupied by envelops. After this occurs each time wall 281 is moved to the left or toward said block and pushes an envelop past said detents the pressure will be transferred through the intervening envelops to said block and the latter will yield, these actions being repeated until eventually the block will reach the opposite side of the machine and the receptacle will be completely filled with envelops. An attendant will then remove the block and such envelops and replace the former in the receptacle near wall 281 so as to be ready to support the next charge of envelops subsequently falling in the receptacle from the overlying chute.

As the support for the envelops and as an aid to wall 281 in carrying them through the receptacle 280, I provide a slowly moving endless conveyer, consisting preferably of a pair of belts 287ª engaging rollers 290 on shaft 147 and rollers 291 on shaft 150.

292 is a bevel gear on shaft 264 meshing with a bevel gear 293 on a vertical shaft 294 suitably journaled and provided with a bevel gear 295 meshing with a bevel gear 296 on shaft 147, a second bevel gear 297 on shaft 294 meshing with a bevel gear 298 on shaft 286 to impart rotation to the latter.

299 is a bevel gear on shaft 264 meshing with a bevel gear 300 on the short shaft 280ʰ carrying the eccentrics 280ᵍ above referred to. 301 is a bevel gear also on shaft 264 meshing with a bevel gear 235 on shaft 186, the twist gear 236 on said shaft meshing with the twist gear 303 on shaft 51.

304 is a bevel gear on shaft 264 meshing with the bevel gear 305 on a short vertical shaft 306 suitably journaled, provided with a bevel gear 307 meshing with a bevel gear 308 on shaft 83 carrying the creasing wheels 82. Shaft 306 is also equipped with a bevel gear 309 meshing with a bevel gear 310 on shaft 75 to operate the feed rolls 73, shaft 75 being connected by a gear 311 with a similar gear 312 on shaft 74 for operating the companion pair of feed rolls 72.

313 is a bevel gear on shaft 264 meshing with a bevel gear 314 on a suitably journaled short shaft 315 equipped with a gear pinion 316 meshing with a gear wheel 317 on shaft 89, and said shaft is provided with a gear wheel 318 meshing with a gear 319 on shaft 92. Shaft 89 is also provided with a bevel gear 320 meshing with a bevel gear 321 on shaft 96.

322 is a worm gear on shaft 132 meshing with a worm wheel 323 on a suitably journaled shaft 324 of belt wheel 112.

From the above description it will be apparent that I have produced a paper-folding and envelop-filling machine possessing the features of advantage enumerated as desirable and which obviously may be modified in various particulars without departing from the spirit and scope of the appended claims.

Having thus described the invention what I claim as new and desire to secure by Letters Patent, is:—

1. In a machine of the character described, a folder comprising a horizontally-arranged V-shaped bottom and walls projecting upwardly from the side edges of said bottom and forming at the apex of the latter, a vertical slot or opening, said bottom having a pair of openings in the plane of its longitudinal center, a traveling belt below the folder and forming a bottom for said openings, means to feed a horizontally arranged sheet upon the horizontal bottom of the folder at its base end, and toward its apex, and alined creasing wheels to press the paper sheet down upon said underlying belt where the same forms a bottom for said openings to crease said paper in line with the apex of the folder.

2. In a machine of the character described, a folder comprising a horizontally arranged V-shaped bottom and walls projecting upwardly from the side edges of said bottom and forming at the apex of the latter a vertical slot or opening, said bottom having a pair of openings in the plane of its longitudinal center, a traveling belt below the folder and forming a bottom for said openings, means to feed a horizontally arranged sheet upon the horizontal bottom of the folder at its base end, and toward its apex, alined creasing wheels to press the paper sheet down upon said underlying belt where the same forms a bottom for said openings to crease the paper in line with the apex of the folder, and a guideway comprising a U-shaped portion to receive the folded edge of the sheet as the latter leaves the folder, and an inverted-U shaped portion to receive the upwardly disposed edges of the sheet at the same time.

3. In a machine of the character described, a folder comprising a horizontally arranged V-shaped bottom and walls projecting upwardly from the side edges of said bottom and forming at the apex of the latter a vertical slot or opening, said bottom having a pair of openings in the plane of its longitudinal center, a traveling belt below the folder and forming a bottom for said openings, means to feed a horizontally arranged sheet upon the horizontal bottom of the folder at its base end and toward its apex, alined creasing wheels to press the paper sheet down upon said underlying belt where the same forms a bottom for said openings to crease the paper in line with the apex of the folder, a guideway comprising a U-shaped portion to receive the folded edge of the sheet as the latter leaves the folder, and an inverted-U portion above and spaced from the said U-shaped portion to receive the upwardly disposed edges of the sheet at the same time, and traveling conveyers to engage opposite sides of the folded sheet between said guideways to conduct such folded sheet through the latter.

4. In a machine of the character described, a folder comprising a horizontally arranged V-shaped bottom and walls projecting upwardly from the side edges of said bottom and forming at the apex of the latter a vertical slot or opening, said bottom having a pair of openings in the plane of its longitudinal center, a traveling belt below the folder and forming a bottom for said openings, means to feed a horizontally arranged sheet upon the horizontal bottom of the folder at its base end and toward its apex, alined creasing wheels to press the paper sheet down upon said underlying belt where the same forms a bottom for said openings to crease the paper in line with the apex of the folder, a guideway comprising a U-shaped portion to receive the folded edge of the sheet as the latter leaves the folder, and an inverted-U portion above and spaced from the said U-shaped portion to receive the upwardly disposed edges of the sheet at the same time, traveling conveyers to engage opposite sides of the folded sheet between said guideways to conduct such folded sheet through the latter, a curved guideway underlying the delivery end of the U-shaped guideway, and means for forcing the folded sheet downwardly out of said first-named guideway and into the curved guideway.

5. In a machine of the character described, a folder, comprising a horizontally arranged V-shaped bottom and walls projecting upwardly from the side edges of said bottom and forming at the apex of the latter a vertical slot or opening, said bottom having a pair of openings in the plane of its longitudinal center, a traveling belt below the folder and forming a bottom for said openings, means to feed a horizontally arranged sheet upon the horizontal bottom of the folder at its base end and toward its apex, alined creasing wheels to press the paper sheet down upon said underlying belt where the same forms a bottom for said openings to crease the paper in line with the apex of the folder, a guideway comprising a U-shaped portion to receive the folded edge of the sheet as the latter leaves the folder, and an inverted-U portion above and spaced from the said U-shaped portion to receive the upwardly disposed edges of the sheet at the same time, traveling conveyers to engage opposite sides of the folded sheet between said guideway to conduct such folded sheet through the latter, a curved guideway underlying the delivery end of the U-shaped guideway, means for forcing the folded sheet downwardly out of said first-named guideway and into the curved guideway, a horizontally arranged folding plate in the plane of the upper side of the curved guideway, endless conveyers extending through the curved guideway and below said folding plate to convey the folded sheet along the bottom of the latter, means for producing a pair of parallel creases in the sheet in substantially the vertical plane of the side edges of said folding plate, and means to force the portions of the sheet outward of said creases upwardly and over upon the folding plate and one upon the other.

6. In a machine of the character described, a suitable frame, a receptacle to receive a stack of sheets and hold them in a substantially upright position, means to successively move the rearmost sheets from said stack upwardly and then cause them to change their course from the upward direction to a rearward direction, means to fold each sheet upwardly from opposite sides so as to cause said sides to assume a substantially vertical position, means to convey the sheets in such position to a point rearward of the folder and to cause it to extend transversely of the machine, with its folded edge downward, means to cause it to move downwardly and rearwardly until its folded and free edges are horizontal, means to move it rearwardly in such position, means to crease it longitudinally of the machine in parallel lines and fold the portions outward of said crease lines successively downward one upon the other and the intermediate portion, means to arrest the folded sheet in its rearward travel, means to cause said folded sheet to move laterally, means to cause said folded sheet to move toward the front end of the machine to a point below the first-named folder, means to again change the course of the folded sheet and cause it to travel below the folder toward the opposite side of the machine, means to again change the course of the folded sheet and cause it to move toward the rear end of the machine, a receptacle extending transversely of the machine, means to deposit the folded sheet in said receptacle, and means to hold said sheet substantially upright in said receptacle.

In testimony whereof I affix my signature in presence of two witnesses.

WILBUR B. McNAMARA.

Witnesses:
 H. C. RODGERS,
 G. Y. THORPE.